United States Patent [19]

Linden

[11] Patent Number: 4,893,835
[45] Date of Patent: Jan. 16, 1990

[54] VEHICLE SEATBELT DEFLECTION DEVICE

[76] Inventor: Scott R. Linden, 17154 Ryeland Rd., Hesperia, Calif. 92345

[21] Appl. No.: 231,203

[22] Filed: Aug. 11, 1988

Related U.S. Application Data

[63] Continuation-in-part of Ser. No. 143,639, Jan. 12, 1988, Pat. No. 4,796,919.

[51] Int. Cl.⁴ .............................................. A47C 31/00
[52] U.S. Cl. .................................. 280/808; 297/483
[58] Field of Search ............... 280/801, 808; 297/468, 297/483

[56] References Cited

U.S. PATENT DOCUMENTS

| Re. 32,448 | 6/1987 | Anderson | 280/808 |
|---|---|---|---|
| 3,860,261 | 1/1975 | Takada | 297/483 |
| 4,056,282 | 11/1977 | Nordh | 297/463 |
| 4,236,755 | 12/1980 | Pollitt et al. | 280/808 |
| 4,289,328 | 9/1981 | Repp et al. | 280/808 |
| 4,343,489 | 8/1982 | Suzuki et al. | 280/804 |
| 4,456,283 | 6/1984 | Michael et al. | 280/804 |
| 4,470,618 | 9/1984 | Ono | 280/808 |
| 4,491,344 | 1/1985 | Föhl | 280/808 |
| 4,550,933 | 11/1985 | Patterson | 280/808 |
| 4,571,001 | 2/1986 | Hakansson | 297/483 |
| 4,573,708 | 3/1986 | Brorsson | 280/808 |
| 4,598,951 | 7/1986 | Ono | 297/483 |
| 4,616,878 | 10/1988 | Föhl | 297/483 |
| 4,634,075 | 1/1987 | Oxley et al. | 280/808 |
| 4,640,550 | 2/1987 | Hakansson | 280/808 |
| 4,652,012 | 3/1987 | Biller et al. | 280/808 |

FOREIGN PATENT DOCUMENTS

3532407-A 3/1987 Fed. Rep. of Germany.

Primary Examiner—Charles A. Marmor
Assistant Examiner—Richard Camby
Attorney, Agent, or Firm—Fulwider, Patton, Lee & Utecht

[57] ABSTRACT

A deflection device attachable to a vehicle lap/shoulder seat-belt below the door post anchorage, free of any attachment to fixed structure of the vehicle, to shorten the length of the shoulder belt portion and dispose it across the chest of a smaller seat occupant such as a child. The attachment prevents relative movement between the shoulder belt portion and the vertical run of the seatbelt located below the door post anchorage.

9 Claims, 4 Drawing Sheets

VEHICLE SEATBELT DEFLECTION DEVICE

CROSS REFERENCE TO RELATED APPLICATION

This application is a continuation-in-part of my co-pending patent application Ser. No. 143,639, issued U.S. Pat. No. 4,796,919 filed Jan. 12, 1988. The present application discloses further embodiments of the deflection device.

BACKGROUND OF THE INVENTION

Field of the Invention

The present invention relates to a vehicle seatbelt deflection device and more particularly to such a device used to dispose the shoulder belt run at a better angle for smaller seat occupants.

DESCRIPTION OF THE PRIOR ART

At the present time the typical vehicle seatbelt extends in a substantially vertical run from an outside anchorage fixed to the vehicle floor on one side of the vehicle seat to a door post anchorage which defines a belt redirection or deflection point above the vehicle seat. The belt is slidably redirected by the door post anchorage into a diagonal run constituting a shoulder belt portion. The diagonal run extends to a buckle which is adapted for detachable connection to an inside anchorage fixed to the vehicle floor on the other side of the vehicle seat.

The outside anchorage is typically an inertia retractor which winds up the excess seatbelt on a spool when the belt is not in use. A seat occupant can pull or pay out some of the excess seatbelt to buckle it in position across his body. The retractor allows relatively slow movements by the occupant, such as leaning forward to reach into a glove compartment, but the retractor reacts to sudden vehicle deceleration to grip the belt and prevent it from being pulled out relatively rapidly. This prevents the user from being thrown forward in a vehicle accident. The seatbelt usually also incorporates a lap run which constitutes a continuation of the shoulder belt or diagonal run, with the buckle slidably redirecting the diagonal run across the lap to define the lap run. The lap run is secured to a lap belt anchorage which is fixed to the vehicle floor adjacent the retractor anchorage.

The locations of the door post and seat buckle anchorages are reasonably effective to properly locate the diagonal run across the chest of most adults, but totally ineffective in the case of a smaller seat occupant such as a child. The diagonal run usually passes directly across the neck or face of a child. Furthermore, the normal operation of the seatbelt retractor undesirably allows a child to pull out some belt slack and wriggle out of the restraint of the seatbelt.

A considerably number of devices has been proposed in the prior art to enable relocation of the diagonal run of the seatbelt so that it will pass across the chest of small seat occupants. However, all of the devices known to applicant depend for operation upon modifying the construction and location of the conventional door post anchorage. Some include a track integrally fixed to the door post and mounting a vertically movable traveler. The traveler slidably accepts the seatbelt in the same way as a conventional door post anchorage, but it can be moved downwardly to a new position, and retightened in that position, to lower the belt redirection or deflection point. U.S. Pat. Nos. 4,640,550 (Hakansson), 4,652,012 (Biller et al), 4,470,618 (Ono), and 4,573,708 (Vrorsson) disclose devices of this general type. Such devices require such significant modification to existing door post anchorages that retrofitting them to already manufactured vehicles is not practical. Furthermore, such devices are incapable of selectively disabling the usual seatbelt retractor/pay-out devices. Consequently, small children can circumvent their purpose and escape the restraint of the seatbelt.

SUMMARY OF THE INVENTION

According to the present invention, an improved deflection device is provided which is operative to shorten the diagonal run of a seatbelt and dispose it at an angle relative to the vertical run which is suitable to the needs of a smaller seat occupant such as a child. The deflection device preferably comprises a clamp which can be laterally slipped over the vertical and diagonal runs of the seatbelt to fixedly clamp the runs against relative movement. The clamp may include a handle, cam member or other member movable into engagement with one of the runs to maintain the clamping action. The clamp may also be made without an element movable to clamp the belt runs, but instead receive the belt runs in such a manner that the belt runs are crimped and thereby fixed against relative movement.

By selecting the point of attachment of the deflection device low enough below the existing conventional door post anchorage, the diagonal run can be made to fall across the chest of a child. This does not require any modification of the existing door post anchorage, and the deflection device is attached only to the seatbelt, free of any attachment to fixed structure of the vehicle. Consequently, the device can be quickly and easily installed for restraining a small child, and equally quickly and easily detached so the seatbelt can be used by an adult.

In some vehicle the present device cannot be used because the vertical run of the seatbelt is not accessible by virtue of location inwardly of a baffle or cover attached to the door post. However, wherever the vertical run is exposed the device can be attached to operate as indicated and to prevent relative movement of the vertical run and paying out of belt slack by a child.

Other aspects and advantages of the present invention will become apparent from the following more detailed description taken in conjunction with the accompanying drawings.

DESCRIPTION OF THE PREFERRED EMBODIMENT

Figure 1:
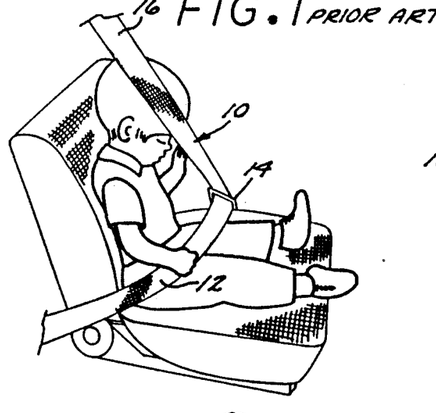
FIG. 1 is a perspective view of a child seated in a vehicle, illustrating the prior art seatbelt arrangement which locates the shoulder or diagonal run of the seatbelt across the face of the child.

Referring now to FIG. 1, a combination lap/shoulder seatbelt 10 is illustrated which has a lap belt portion or run 12 and a shoulder belt portion or diagonal run 16. The lap run 12 extends across the lap of the child, and through the loop of a buckle 14. The diagonal run 16 is a continuation of the lap run 12, extending from the buckle 14 diagonally upwardly to a door post anchorage (not shown). The location of the diagonal run 16 is clearly objectionable, falling as it does across the face of the child. The illustrated arrangement is also not able to prevent the child from pulling upon the belt and withdrawing slack from the usual inertia retractor mechanism and thereby escaping the restraint of the seatbelt.

Figure 2:
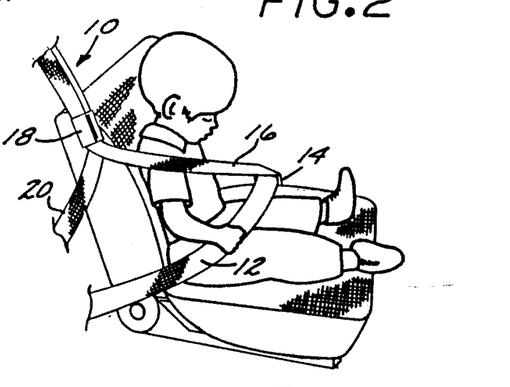
FIG. 2 is a view similar to FIG. 1, but illustrating proper location of the diagonal run across the child's chest through use of the present deflection device.

In FIG. 2 the present deflection device 18 is shown clamping together a vertical run 20 and the diagonal run 16 to prevent relative movement between them. It also redirects or deflects the diagonal run 16 so that it passes across the chest of the child. The device 18 is free of an connection to fixed structure of the vehicle and, as will be seen, its vertical position or height can easily be adjusted. It also can be quickly detached so the seatbelt can be used by an adult.

Figure 3:
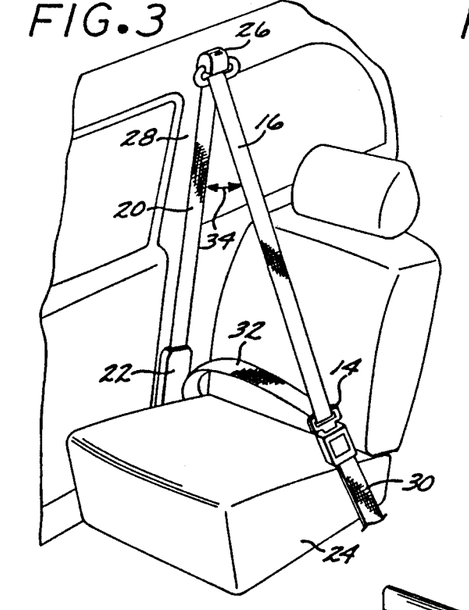
FIG. 3 is an enlarged perspective view of a vehicle prior to installation of the deflection device.
Figure 4:
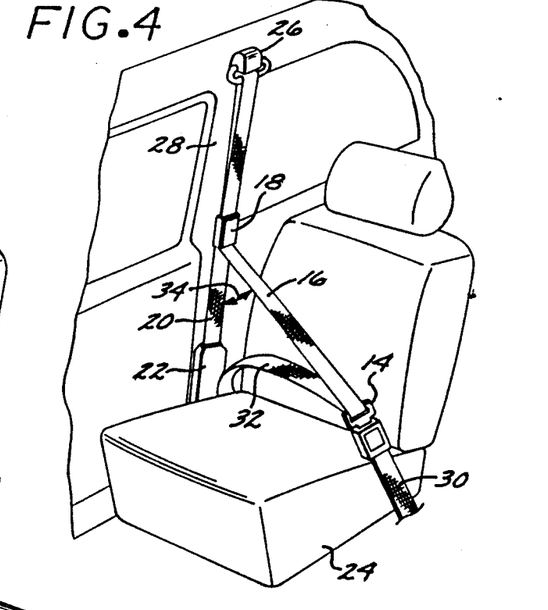
FIG. 4 is a view similar to FIG. 3, but illustrating the deflection device in operative position.

Further details of the device and the location of the various anchorages are illustrated in FIGS. 3 and 4. The vertical run 20 can be seen to extend substantially vertically from an outside anchorage or retractor 22 which is fixed to the vehicle floor on one side of the vehicle seat 24. The run 20 is slidably trained through the closed loop of a door post anchorage 26 which is secured to the vehicle door post 28. The belt is redirected by the anchorage to define the diagonal run 16 which extends to the buckle 14. The buckle is carried by the seatbelt and is detachably connected to an inside anchorage 30 fixed to the vehicle floor on the other side of the seat 24.

The device 18 can be used with a shoulder belt type of seatbelt, but it is illustrated in combination with the more common lap/shoulder type of seatbelt. This type of seatbelt includes a continuous run which slidably passes through a closed loop of the buckle 14. The position of the buckle divides the belt into the lap run 12 and the diagonal run 16. The other end of the lap run 12 is secured to a lapbelt anchorage (not shown) fixed to the vehicle floor adjacent the retractor 22.

Details of the retractor 22, buckle 14 and the various anchorages are omitted for brevity inasmuch as they form no part of the present invention and are well known in the art. However, the retractor 22 is typically an inertia type which includes a spool or reel wound against the bias of a spring so that it always acts to retract excess slack in the belt. When the belt is not in use this positions the lap and diagonal runs against the vertical run 20 in taut, vertically oriented relation.

To use the belt an adult grasps the buckle 14, brings it across his chest and snaps it into a complemental receptacle forming part of the inside anchorage 30. During this procedure the belt pays out from the retractor 22, slides through the post anchorage 26, and divides itself into the runs 16 and 32, according to the size of the occupant, by sliding through the buckle 14.

The conventional door post anchorage 26 is located at a predetermined height to place the diagonal run 16 across the chest of the adult, and at a predetermined angle 34 relative to the vertical run 20. To render the belt useful in restraining a child, the present device 18 is placed in the position illustrated in FIG. 4 to effectively shorten the length of the diagonal run 16 and increase the angle 34. In this position, as will be seen, the device also constrains the runs 20 and 16 against relative movement at the point of attachment. This has the effect of also preventing the upward movement of the vertical run 20 which is necessary to pay out slack from the retractor 22. Consequently, a child cannot lean forward or pull upon the belt runs to wriggle out and escape the constraint of the belt.

Figures 5, 6:
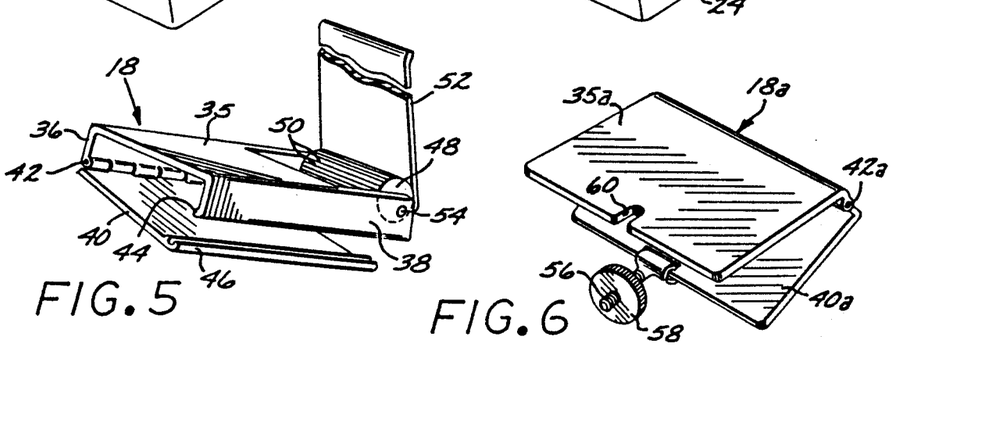
FIG. 5 is a perspective view of a first form of deflection device according to the present invention.
FIG. 6 is a perspective view of a second form of deflection device according to the present invention.

A first embodiment of the deflection device 18 is illustrated in FIG. 5. It comprises a clamp having an elongated, channel shape upper frame member 35 with parallel, oppositely disposed sides or legs 36 and 38. The longitudinal edge of leg 36 includes an interrupted bead defining a plurality of spaced apart hinge knuckles which interfit with similar, complemental hinge knuckles provided in an edge margin of a frame plate 40. The generally rectangular frame plate is coextensive with and pivotally mounted to frame member 34 by a hinge pin 42 which extends through the respective hinge knuckles.

The opposite leg 38 includes an enlarged edge margin or bead 44 adapted to snap fit within a complemental groove provided in a bead 46 at the free edge margin of the plate 40.

When plate 40 is closed against frame member 35, an elongated generally rectangular passageway is defined which is adapted to snugly receive overlying runs of the seatbelt.

The end portion of the frame member 35 is formed or cut away to receive a cylindrical cam member 48 having external grooves or gripping ridges 50. The cam member 48 is pivotable by an integral projecting plate or handle 52, the cam 48 being eccentrically mounted to frame legs 36 and 38 by a hinge pin 54. Bias means (not shown) normally bias the handle 52 from the release position illustrated to a clamping position in which it is coplanar with the frame member 35. In the clamping position the cam member 48 extends into the frame passageway, with the ridges 50 engaged upon one of the two belt runs in the frame passageway to constrain the runs against relative movement.

Assuming the seatbelt is to be redirected to suit a small child, the buckle 14 is snapped into position and the belt run 16 held by hand in the desired position across the child's chest. The end of the redirected, shortened run 16 opposite the buckle 14 is pressed against the vertical run 20 at the height which defines the desired angle 34. The device 18 is then opened, with the handle 52 pulled upwardly against its spring bias, and placed over the belt runs 16 and 20 so that they overlie one another in the frame passageway.

The plate 40 is next snapped shut, the handle 52 allowed to move to its closed position, and the handle then forcibly pressed downwardly to snub the cam member against the overlying belt runs and constrain them against relative movement.

A second form of deflection device 18a is illustrated in FIG. 6, the subscript "a" being used to denote structures and elements analogous to those of FIG. 5 bearing corresponding numbers.

The device 18a comprises a clamp having generally rectangular upper and lower plate or frame numbers 35a and 40a pivotally secured together at one of their edge margins by a hinge 42a. The corners of the members are preferably rounded so as not to catch on clothing. The inner surfaces of the members are preferably ribbed (not shown) or provided with a non-slip coating to prevent slippage relative to the belt runs.

The member 40a includes a slot within which is pivotally carried the curved end of a threaded post 56. The opposite end of the post threadedly carries an enlarged nut or knob 58. The post is pivotable about the edge margin of the frame member defining the slot, being movable into a slot 60 provided in the frame member 35a.

In operation the device 18a is laterally slipped over the belt runs, and the post 56 is the pivoted from the position illustrate din FIG. 6 to a position in which the knob 58 overlies the slot 60. The knob is then tightened to press against member 36a and thus urge together the frame members 35a and 40a against the belt runs, thereby constraining the belt runs against relative movement.

Figure 7:
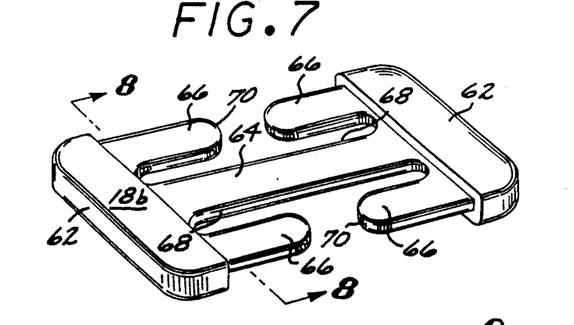
FIG. 7 is a perspective view of a third embodiment of a deflection device according to the present invention.
Figure 8:
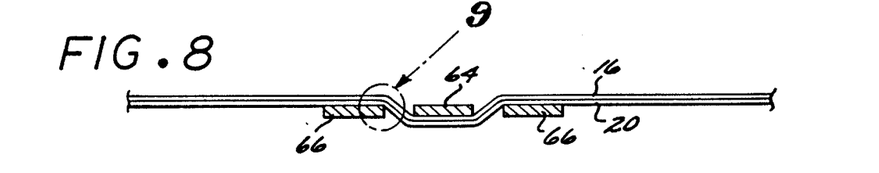
FIG. 8 is an enlarged view taken along the line 8—8 of FIG. 7.
Figure 9:
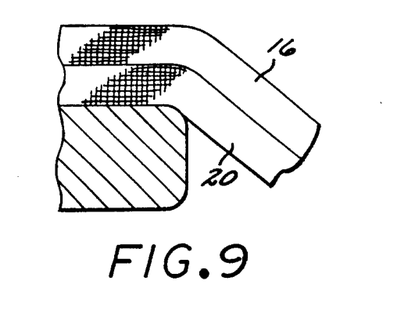
FIG. 9 is a further enlarged detail view taken at the location indicated by the numeral 9 in FIG. 8.
Figure 28:
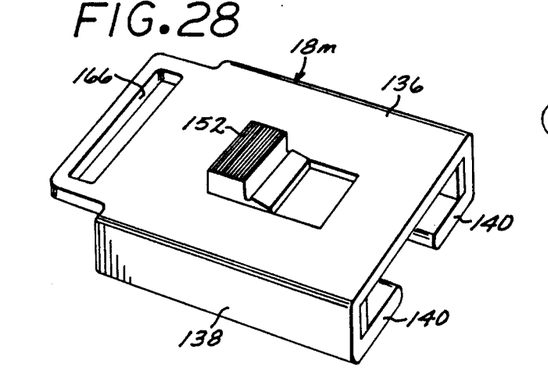
FIG. 28 is a view similar to FIG. 22, but illustrating the device provided with a mounting extension.
Figure 29:
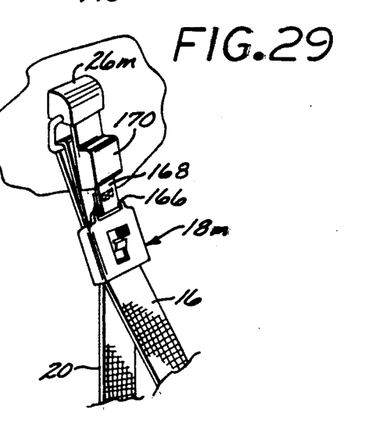
FIG. 29 is a perspective view of the device of FIG. 28 mounted in position adjacent a door post anchorage.

As will be apparent, the device 18 or 18a can be quickly removed and stored in the glove compartment when the seatbelt is to be used by an adult. As will be seen, the embodiment of FIGS. 28 and 29 is adapted to be suspended in position by a supporting strap so that it cannot be misplaced, and so that it will be conveniently available when needed. In either event, when the device s not attached to the belt runs the inertia retractor mechanism operates in the normal way, permitting the user to move about, but arresting his or her movement during sudden vehicle deceleration. FIGS. 7-9 illustrate a third embodiment of the deflection device, designated generally by the numeral 18b. Like the previous embodiments of the device, and those subsequently to be described, the device 18b functions to receive the belt runs 16 and 20 and constrain them against relative movement. Also, like numerals are used to designate like parts, with a letter subscript being used to denote parts that are not identical but which are similar in function.

Devices like that of FIG. 7 are well known in the art to constrain belt runs against relative movement, but as applicant is aware, such devices have not been modified or used in the manner herein disclosed. In this regard, device 18b has been specially fabricated to withstand the high forces encountered in vehicle crashes and to protect the user during such a crash.

The device 18b comprises a pair of opposite end sections received within and covered by end caps 62. The caps 62 are made of any suitable plastic material tough enough to withstand abrading and the usual rough wear to which seatbelt hardware is subjected. The material is also preferably resilient to avoid cutting or injuring the user during a crash.

The caps 62 are heated and shrink fitted, adhesively bonded, or otherwise firmly seated in position to prevent inadvertent removal.

The end sections of the device are connected by an integral center web or post 64. Also integral with each of the end sections are a pair of end posts 66 extending parallel with the center post 64 and spaced from it. Each pair of opposite end posts are spaced away from the center post to define an elongated belt slot 68, and are spaced apart from each other to define an entry throat 70 opening into the associated belt slot 68.

The free ends of the end posts 66 and the ends of the slots 68 are rounded to reduce abrading of the belt runs. In addition, the corners or edges of all exposed portions of the device 18b are rounded, as by shot peening, to reduce belt abrasion.

Since the forces encountered in a vehicle crash are exceedingly high, the device 18b is preferably made of high strength material such as SAE 4130 steel approximately three eighths of an inch thick and tempered to Rockwell 44.

All portions of the device 18b preferably lie in one plane for ease of fabrication, but the center post 64 could, if desired, be moved out of the plane of the ends posts 66 to increase the crimping action upon the belt runs.

FIG. 8 illustrates the crimping action on the belt runs, which has been found to be adequate to constrain them against any relative movement. Crimping in the embodiment illustrated was achieved with a width of one-fourth of an inch for the slots 68, and a width of one half inch for the center post.

In operation, the device 18b is located in the position illustrated in FIG. 4 and the belt runs 16 and 20 are manipulated to pass through the entry throats 70 for receipt in the belt slots 68. When the device is no longer needed because of occupancy of the seat by a user of average stature, the device 18b is easily removed from the belt runs and stored in the glove box or the like.

Figure 10:
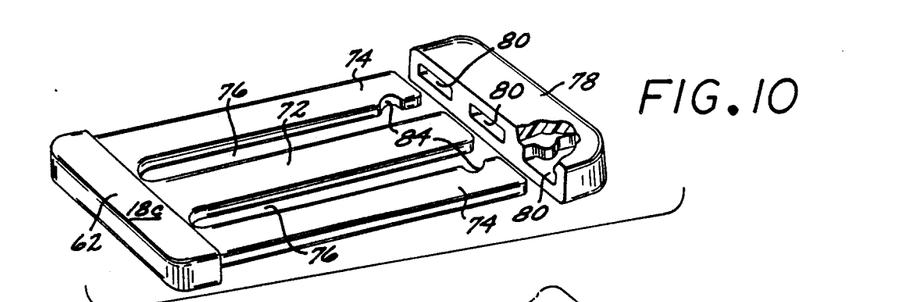
FIG. 10 is a perspective view of a fourth form of deflection device according to the present invention.

The fourth embodiment illustrated in FIG. 10 is essentially identical to the embodiment of FIG. 7 except that one of the end portions is omitted and the end cap at that end is modified to enable its rapid removal for easier training of the belt runs through the device.

The device 18c comprises an end portion covered by an end cap 62 of the type previously described. It also comprises a center post 72 and end posts 74 integral with the end portion covered by the cap 62. The posts are coextensive and define belt slots 76 open at the free ends of the posts. Thus, the belt entry throats are at the ends of the posts, which makes end insertion of the belt runs into the slots an easier matter.

Once the belt runs are properly located within the belt slots 76, in a manner similar to the orientation illustrated in FIG. 8, an end cap 78 is fitted over the free ends of the posts 72 and 74.

The end cap 78 is made of a material like that of the end cap 62, but it includes three cavities 80, the end ones of which are each characterized by an inwardly directed keying means in the form of a protuberance 82. The protuberance is resiliently deflectable upon insertion of the associated end post 74 into the cavity, following which the protuberance 82 seats within an arcuate cutout o seat 84 which is formed in the inwardly directed edge of each of the end posts. This arrangement eases insertion of the belt runs, but requires the additional step of attaching and detaching the special end cap 78.

Figure 11:
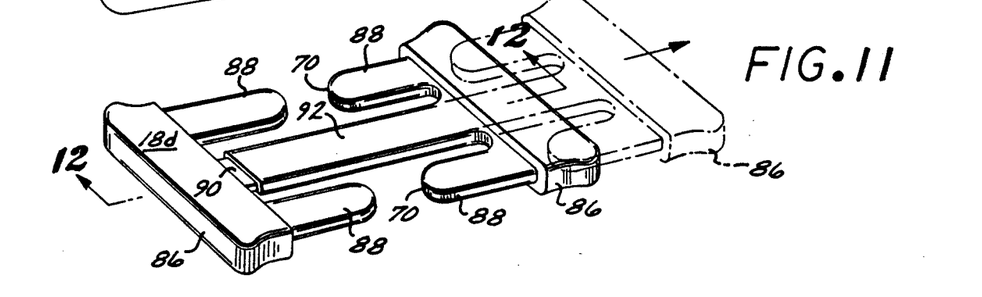
FIG. 11 is a perspective view of a fifth embodiment of a deflection device according to the present invention.
Figure 12:
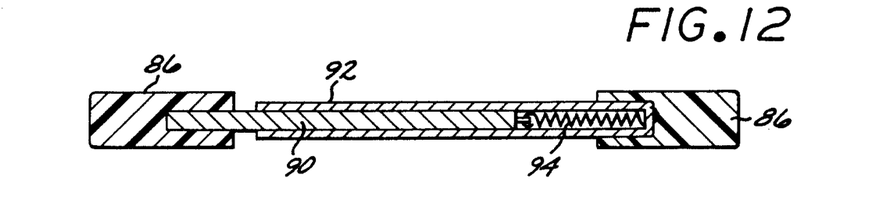
FIG. 12 is a view taken along the line 12—12 of FIG. 11.

FIGS. 11 and 12 illustrate a device 18d which is very similar to the embodiment of FIG. 7. However, the device enables movement of the end portions away from each other to open the entry throats for easier insertion of the belt runs.

The end portions of the device 18d are capped by end caps 86 similar to the end caps 62 in material and construction. The end portions are integral with end posts 88 similar in construction and orientation to the end posts 66 of the embodiment of FIG. 7. However, the center post is of telescoping construction, comprising elongated center posts 90 and 92 associated with the end portions, respectively, but with the center post 90 telescopably fitted within the hollow interior of the center post 92. As seen in FIG. 12, the posts 90 and 92 are urged into the positions illustrated in full line in FIG. 11 by a tension spring 94 which is located within the hollow interior of the center post 92. It is attached at its opposite ends to the posts 90 and 92 to draw them together.

To mount the device 18d, the end portions are grasped to extend the spring 94, thereby widening the entry throats 70 to facilitate insertion of the belt runs. Once the belt runs are in position, the end portions are released, allowing them to move together into their operative positions.

A sixth embodiment of the present invention is illustrated in FIGS. 13–16. The illustrated device 18e comprises end portions covered by end caps 96 and integral with side posts 98, like the caps and side posts of the embodiment of FIG. 7. However, the center post is differently constructed to facilitate placement of the belt runs in their operative positions.

Figure 14:
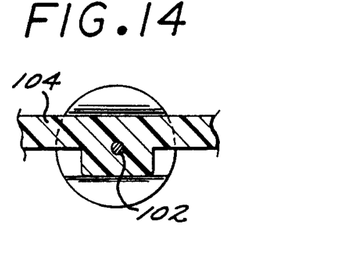
FIG. 14 is a detail view taken along the line 14—14 of FIG. 13.

More particularly, the center post 100 is not connected at its ends to the device end portions but instead is fixed to an elongated shaft 102 which is rotatable in the device end portions, one of which is shown in detail at 104 in FIG. 14.

Figure 13:
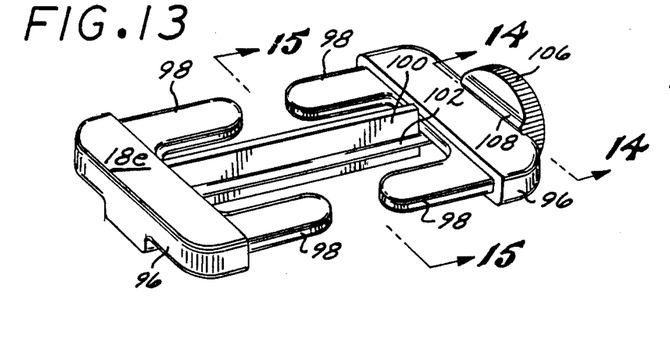
FIG. 13 is a perspective view of a sixth form of deflection device according to the present invention.

The shaft 102 is fixed to and is rotatable by a knurled knob 106 having its inside face engaged upon the end surface of the adjacent end cap 96, as seen in FIG. 13. The knob 106 is characterized by a pair of ridges, one of which is seen at 108. These underlie and overlie the adjacent edges of the end cap 96, respectively.

Figure 15:
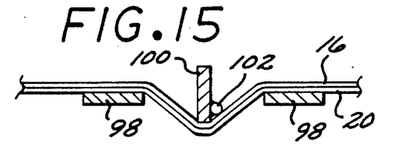
FIG. 15 is a view taken along the line 15—15 of FIG. 13, illustrating one position of the rotatable center post.
Figure 16:
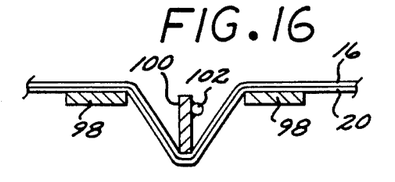
FIG. 16 is a view similar to FIG. 15, but illustrating the center post in its oppositely pivoted state.

Although many indexing arrangements will suggest themselves to those skilled in the art, the present arrangement depends upon the resilience of the plastic material of the end cap 96 for deformation of the ridges 108 to permit the knob 106 to be rotated through 180 degrees between the positions of FIGS. 15 and 16. In FIGS. 15 the wider portion of the center post 100 is upwardly located, while it is oppositely located in FIG. 16.

Locating the center post 100 perpendicular to the plane of the end posts 98 open the belt slots to facilitate positioning of the belt runs. In addition, the crimping action of the center post can be increased with the post located in the position of FIG. 16. This greater deflection of the belt runs more firmly constrains them against relative movement.

Figure 17:
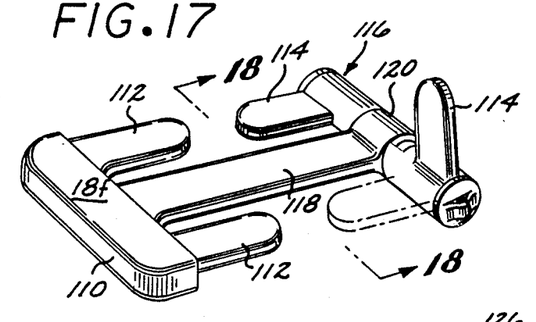
FIG. 17 is a perspective view of a seventh embodiment of the present deflection device.
Figure 18:
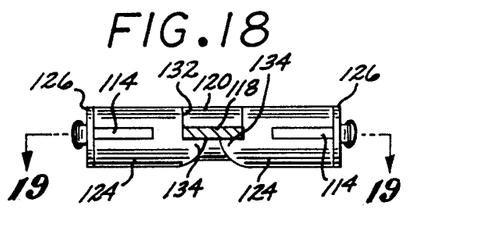
FIG. 18 is a view taken along the line 18—18 of FIG. 17.
Figure 19:
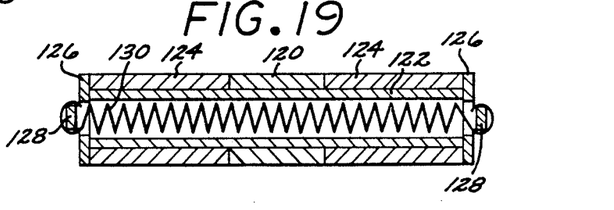
FIG. 19 is a view taken along the line 19—19 of FIG. 18.

FIGS. 17–19 illustrate a further embodiment of the invention which is characterized by yet another means facilitating insertion of the belt runs. The device 18f is substantially identical to the embodiment of FIG. 7 except for a construction of one of the end portions to permit relative movement of the end posts of that end portion relative to the end posts of the other portion. One end portion of the device is capped by an end cap 110 like the end cap 62 of the embodiment of FIG. 7. It is also integral with a center post 118 and a pair of end posts 112 spaced from the center posts to define belt slots. Oppositely located or confronting end posts 114 are integral with an opposite end portion 116 and are spaced from the end posts 112 to define entry throats, all as seen in the embodiment of FIG. 7. However, the end posts 114 are upwardly pivotable, as seen in FIG. 17, to facilitate placement of the belt runs within the belt slots. Also, the center post 118 which is integral with the end posts at one end includes a cylindrical end 120 at its opposite end. The end 120 fixedly receives a transversely disposed tubular journal 122.

The end posts 114 are provided with cylindrical ends 124 which are rotatable upon the journal 122 on opposite sides of the center post end 120. A pair of circular spring retainers 126 having mounting ears 128, respectively, are fitted against the outer ends of the end posts end 124, as best seen in FIG. 19.

An elongated tension spring 130 is located within the hollow interior of the tubular journal 122. Its ends are fitted through and are securely held by the mounting ears 128. With this arrangement the spring 130 urges the end post ends 124 toward each other and into engagement with the center post end 120, as seen in FIGS. 18 and 19.

A portion of each of the post ends 124 is cut away to provide a recess 132 having a wall or lip 134. In the operative position of the ends 124 the lips 134 engage the underside of the center post, as best seen in FIG. 18. The lips 134 prevent the end posts 114 from being rotated from the phantom line position of FIG. 17 to the full line position.

Figure 20:
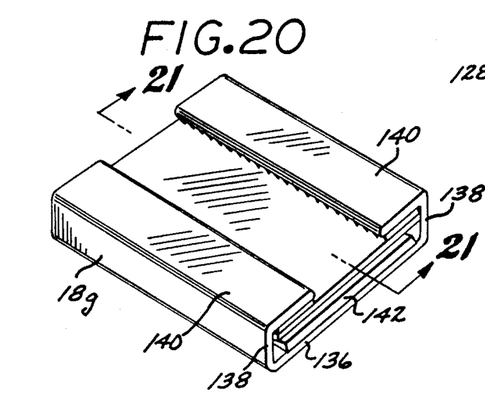
FIG. 20 is a perspective view of an eighth embodiment of the present deflection device.
Figure 21:
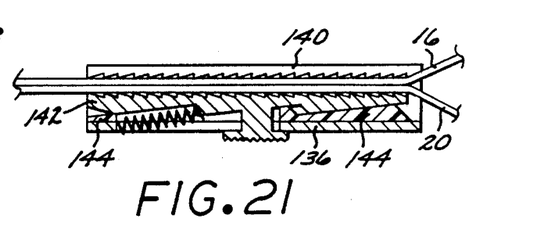
FIG. 21 is a view taken along the line 21—21 of FIG. 20.

Each of the end posts 114 can be pulled outwardly against the bias of the spring 130 to disengage the lips 134. This permits the end posts 114 to be pivoted so that the belt runs can be more easily inserted in the belt slots. Backward rotation and release of the end posts then allows them to be reseated in their regular or operative positions. Referring now to FIGS. 20–21, yet another embodiment of the present deflection device is illustrated, designated 18g. It generally comprises a channel of rectangular transverse cross section having a base 136, sides 138, and flanges 140 overlying the base. The flanges are spaced apart to define an elongated entry throat through which the belt runs can be inserted.

The undersides of the flanges 140 are toothed or ridged. Confronting teeth or ridges are also provided in the upper face of a generally rectangular, longitudinally slidable slide 142. The teeth in the slide 142 and flanges 140 are directionally oriented so that a downward pulling upon the belt runs tends to move the slide 142 up the sloping surface of ramps 144 attached to the base 136. This more tightly grips the belt runs.

The slide 142 can be moved to release the gripping action by engaging and moving a ridged thumb element or actuating member 146. The member 146 is integral with the slide 142 and projects outwardly through a suitable slot in the base 136. A tension spring 148 tends to aid in moving the slide to a release position. It is connected at its opposite ends to the base 136 and slide 142. In the release position of the slide the belt runs are easily removed through the throat entry slot between the flanges 140.

The embodiment illustrated in FIGS. 22–25, generally designated 18h, is generally similar to the embodiment of FIG. 20 except for the action of the slide 150. The slide is associated with and is movable by a ridged thumb element or actuating member 152 as before, but the slide is of a downwardly open channel shape. The depending channels legs rotatably mount a gripping roller 144 which is characterized by gripping ridges adapted to engage the belt runs. The pin or shaft that mounts the roller 154 is captured and slidable at its opposite ends within downwardly sloping ramp means or cam slots 156. The slots 156 are provided in side plates 158 which engage and are secured to the channel sides 138. Movement of the actuating member 152 downwardly and longitudinally from the position of FIG. 23 to that of FIG. 25 will also move the gripping roller 154 downwardly. It tends to be held in this position by receipt of an indexing element 155 of the base 136 within a detent 157. The inward position of the slide cause the gripping ridges of the roller to tightly engage the upper one of the belt runs, and also force the lower on of the belt runs into engagement with toothed or ridged surfaces provided on the inside surfaces of the flanges 140.

Figures 22, 23:
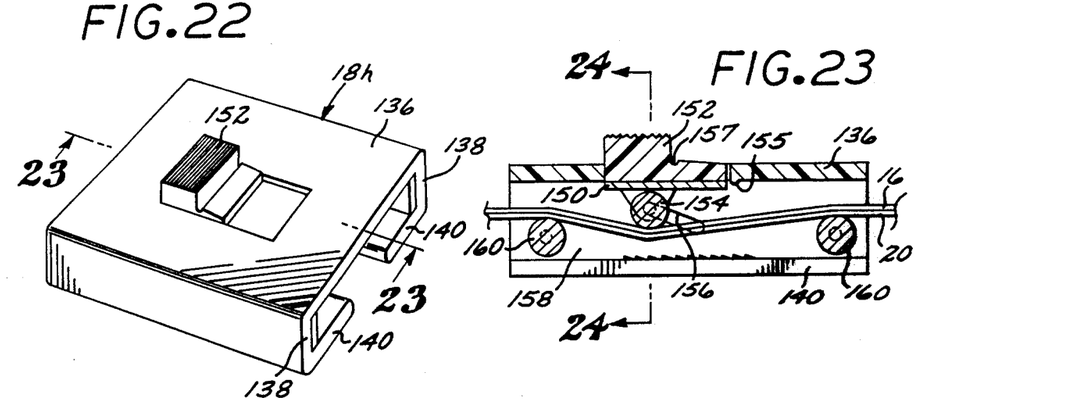
FIG. 22 is a perspective view of a ninth embodiment of the present deflection device.
FIG. 23 is a view taken along the line 23—23 of FIG. 22.
Figures 24, 25:
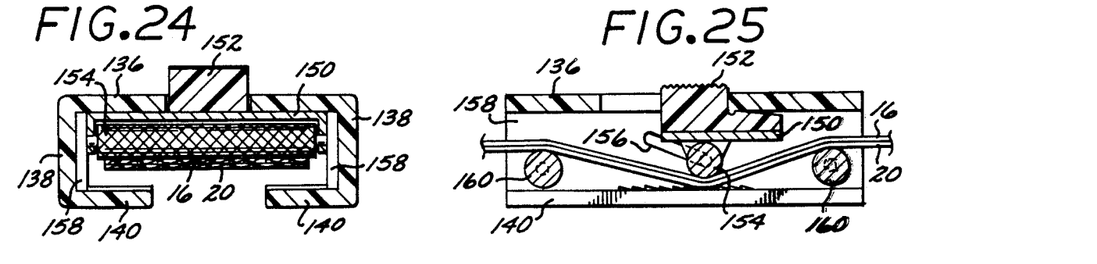
FIG. 24 is a view taken along the line 24—24 of FIG. 23.
FIG. 25 is a view similar to FIG. 23, but illustrating the actuating member in a belt clamping position.

Downward movement of the gripping roller 154 also crimps or deflects the belt runs relative to a pair of idler gripping rollers 160 over which the belt runs are passed. These rollers extend across and are rotatably carried by the side plates 158.

Figure 26:
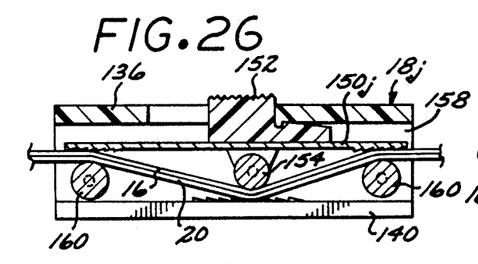
FIG. 26 is a longitudinal cross sectional view of a tenth embodiment of the present deflection device.

FIG. 26 illustrates another embodiment 18j. It is substantially identical to the embodiment of FIG. 25 except for the slide. The slide 150j is made longer than the slide 50 of FIG. 25, and it is provided on the undersides of its end extremities with gripping elements or teeth. When the actuating member 152 is pressed downwardly and longitudinally, these engage the upper one of the belt runs and press the belt runs against the gripping ridges of the idler rollers 160.

Figure 27:
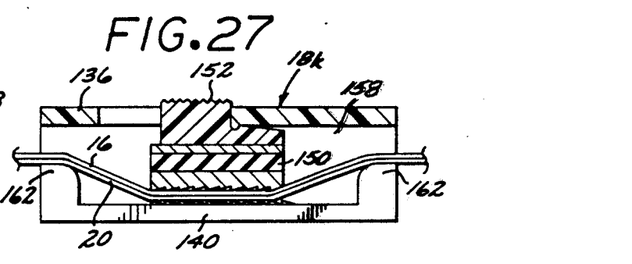
FIG. 27 is a view illustrating an eleventh embodiment of the present deflection device.

FIG. 27 illustrates yet another embodiment, designated 18k, generally similar to the embodiment of FIG. 25. Device 18k includes the same channel construction which accommodates a slide actuable by an actuating member 152. However, the rollers 160 are omitted, the slide is deeper and includes gripping teeth on its underside, and the channel includes end abutments 162 over which the belt runs pass. The deeper slide is actuable to engage the upper one of the belt runs and deflect or crimp the belt runs between the slide underside and the abutments 162.

The embodiment of FIG. 28, generally designated 18m, may internally take the form of any of the preceding embodiments, its main feature being that it includes an end or mounting extension 164 having a transverse belt slot 166. As seen in FIG. 29, the slot is adapted to receive the end loop of a flexible tether or supporting strap 168 which is attached to a modified door post anchorage 26m. This anchorage operates in a manner identical to that of the anchorage 26 shown in FIG. 4, simply being more elongated to include a lower portion 170 to fixedly receive and support the upper extremity of the supporting strap 168.

The length of the strap is preferably made such that it will permit the deflection device to be located in any of a number of deflection point locations, according to the stature of the smaller user. When a person of normal stature is using the seat and lap belts, the device 18m is simply detached from the deflection device and suspended on the strap 168. It is not separately stored and therefore cannot be misplaced. When a child is to be strapped into position on the vehicle seat, for example, the belt runs 16 and 20 are manipulated so they fit into the belt entry throat of the deflection device at the proper height or deflection point and the device then operates as previously described.

Any suitable clamp member can be used to accomplish the foregoing operations, the major requirement being that it be adapted for location anywhere along the length of the vertical run 20 below the door post anchorage 26, and be operable to constrain the belt runs against relative movement. Also, for proper operation and convenience of use the device should be mounted solely to the seatbelt runs, free of any attachment to fixed structure of the vehicle such as the door post 28. As seen from the foregoing description of the various embodiments, the belt runs can be gripped by a pivotable cam or frame member, as in the embodiments of FIGS. 5 and 6. The belt runs can also be constrained against relative movement by crimping them, as in the embodiments of FIGS. 7–19, or gripped and crimped by a slide movable by an actuating member, as seen in the embodiments of FIGS. 20–27. Finally, the deflection device can be completely separable from the belt runs for convenient storage elsewhere, or the deflection device can be suspended from a supporting strap, as seen in FIGS. 28 and 29, for easy accessibility.

Various modifications and changes may be made with regard to the foregoing detailed description without departing from the spirit of the invention.

What is claimed is:

1. In combination with a vehicle seat belt which extends in a substantially vertical run from an outside anchorage on one side of a vehicle seat to a door post anchorage, and which then extend in a diagonal run from the door post anchorage to a buckle means adapted for detachable connection to an inside anchorage on the other side of the vehicle seat, an improved deflection device for shortening the diagonal run and disposing it at a greater angle relative to the vertical run to suit the seatbelt to a smaller seat occupant, the deflection device comprising:

clamping means operative to fixedly clamp the diagonal run to the vertical run below the door post anchorage at a location which is selected to dispose the diagonal run at a desired angle relative to the vertical run, the clamping means including a channel shape frame having a base and overlying flanges spaced apart to define a belt entry throat; slide means in the channel movable between a first position wherein the diagonal and vertical runs are freely received through the entry throat and between the slide means and the flanges, and a second position wherein the diagonal and vertical runs are clamped between the slide means and the flanges and constrain the diagonal and vertical runs against relative movement.

2. A deflection device according to claim 1 including ramp means located in the channel, and wherein the slide means are movable along the ramp means between the first and second positions.

3. A deflection device according to claim 2 including bias mean tending to urge the slide means toward the first position.

4. A deflection device according to claim 1 wherein the channel includes a pair of longitudinally spaced apart, transversely oriented idler rollers, and the slide means includes a gripping roller located between the idler rollers and engaged upon one of the belt runs in the second position, the belt runs extending over the idler rollers and being deflected by and passing under the gripping roller.

5. A deflection device according to claim 4 wherein the channel includes means defining inclined slots, and the gripping roller includes a shaft slidable in the slots during movement between the first and second positions.

6. A deflection device according to claim 4 wherein the slide means includes a plate engageable in the second position to grip the belt runs between the plate and the idler rollers.

7. A deflection device according to claim 1 wherein the channel includes a pair of longitudinally spaced apart belt abutments, and the slide means in the second position deflects the belt runs extending between and passing over the belt abutments.

8. A deflection device according to claim 1 wherein the deflection device includes an opening, a strap held within the opening, and attachment means attaching the strap adjacent the door post anchorage to suspend the deflection device below the door post anchorage.

9. A deflection device according to claim 1 wherein the deflection device includes an opening, a strap held within the opening, and attachment means attaching the strap adjacent the door post anchorage to suspend the deflection device below the door post anchorage.

* * * * *